United States Patent [19]

Nakagawa et al.

[11] Patent Number: 4,663,396

[45] Date of Patent: May 5, 1987

[54] METHOD FOR PRODUCING CHLOROSULFONATED POLYETHYLENE WITH CONTROLLING ADDITION AMOUNT OF SULFUR OF THE CHLOROSULFONATED POLYETHYLENE

[75] Inventors: Tatsushi Nakagawa, Shinnanyo; Mamoru Narui, Kudamatsu; Yasuhiro Sakanaka, Shinnanyo, all of Japan

[73] Assignee: Toyo Soda Manufacturing Co., Ltd., Yamaguchi, Japan

[21] Appl. No.: 702,434

[22] Filed: Feb. 19, 1985

Related U.S. Application Data

[63] Continuation-in-part of Ser. No. 522,579, Aug. 12, 1983, abandoned.

[30] Foreign Application Priority Data

Aug. 18, 1982 [JP] Japan ................................ 57-142075

[51] Int. Cl.⁴ .............................................. C08F 8/38
[52] U.S. Cl. .................................. 525/344; 524/109; 525/333.9
[58] Field of Search .......................................... 525/344

[56] References Cited

U.S. PATENT DOCUMENTS 3,542,747 11/1970 Ennis ..................... 525/344
4,145,491 3/1979 Ryan ..................... 525/344

FOREIGN PATENT DOCUMENTS 33-7838 9/1958 Japan.
39-12113 6/1964 Japan.
56-76406 6/1981 Japan.
879963 10/1961 United Kingdom ............... 525/344

Primary Examiner—Christopher Henderson
Attorney, Agent, or Firm—Armstrong, Nikaido, Marmelstein & Kubovcik

[57] ABSTRACT

A method for producing chlorosulfonated polyethylene with controlled addition of the amount of sulfur added to the polyethylene. Polyethylene dissolved in halogenated hydrocarbon is reacted with sulfuryl chloride in the presence of a catalyst of a radical generating agent in a binary phase system. The addition amount of sulfur is controlled by adding an amine compound to the reaction in an amount within the range where the following formula is applicable:

$$\log_{10} S = \alpha \cdot \log_{10} A + \beta \qquad (1)$$

wherein
S: reaction yield (%) of sulfur of sulfuryl chloride
A: concentration (mol/liter) of amine compound in halogenated hydrocarbon solvent
$\alpha, \beta$: constants such that $1.0 < \alpha < 3.0$
$4.0 < \alpha < 12.0$.

10 Claims, 2 Drawing Figures

METHOD FOR PRODUCING CHLOROSULFONATED POLYETHYLENE WITH CONTROLLING ADDITION AMOUNT OF SULFUR OF THE CHLOROSULFONATED POLYETHYLENE

This application is a continuation-in-part of application Ser. No. 522,579, filed Aug. 12, 1983, now abandoned.

DETAILED DESCRIPTION OF THIS INVENTION

Figure 1:
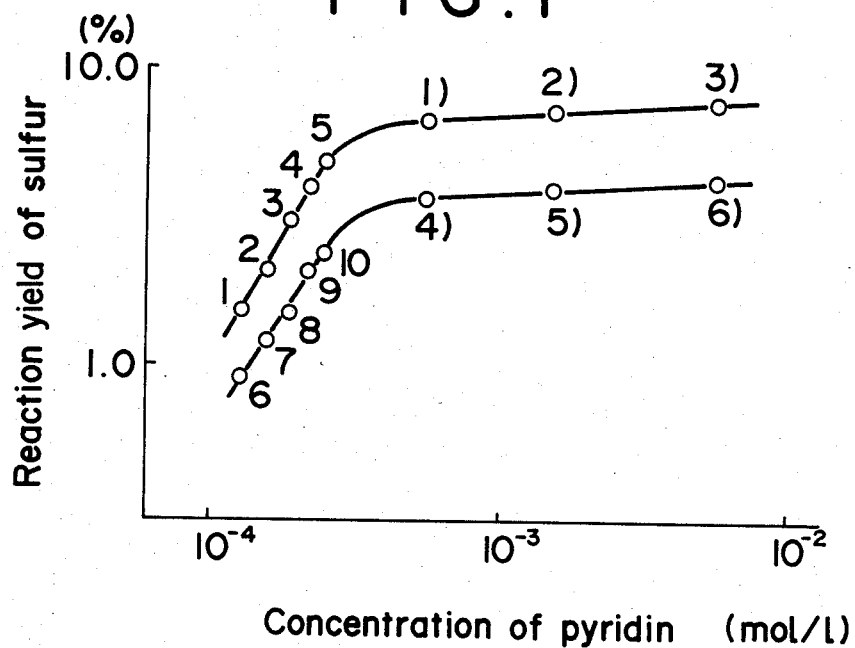

This invention relates to a method for producing chlorosulfonated polyethylene by reacting polyethylene with sulfuryl chloride in use of halogenated hydrocarbon as a solvent. Chlorosulfonated polyethylene is one chlorinated and chlorosulfonated so as to contain 20-60 wt % (preferably 25-45 wt %) of chlorine and 0.3-3.0 wt % (preferably 0.8-1.5 wt %) of sulfur in a molecule thereof, and it is easily cured with metal oxides, curing accelerators or various kinds of inorganic filler to be used an elastomer excellent in weather-resisting, ozone-resisting, heat-resisting, chemicals-resisting and bright colored properties.

As a process for producing chlorosulfonated polyethylene, it is known a method that polyethylene dissolved in halogenated hydrocarbon is reacted with sulfuryl chloride in presence of a catalyst of radical generating agent and an auxiliary catalyst of amine compound (Refer to Japanese examined patent publication No. sho 39-12113).

This method differs from the method of reaction wherein chlorinating reaction and chlorosulfonating reaction are carried out separately (for example, there are a method of simultaneously using chlorine and sulfur dioxide, as seen in Japanese examined patent publication No. sho 33-7838, and a method of simultaneously using chlorine and sulfuryl chloride, as seen in Japanese unexamined patent publication No. sho 56-76406), and it is featured in a point of synthesizing chlorosulfonated polyethylene by performing chlorinating reaction and chlorosulfonating reaction all at once with use of one reagent (sulfuryl chloride).

The fact that chlorinating step with chlorine can be omitted like this causes shortening of reaction time and elevation of polyethylene concentration in the reaction mixture, and therefore it is an industrially advantageous reaction method.

The reaction formula of polyethylene and sulfuryl chloride is as follows.

Reaction Formula

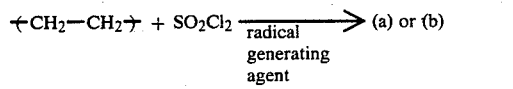

(a) Chlorinating Reaction        formula (2)

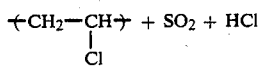

(b) Chlorosulfonating Reaction   formula (3)

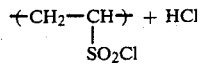

wherein $-(CH_2-CH_2)-$ denotes a part of polyethylene chain.

However, in this reaction method, sulfuryl chloride participates in both of chlorinating (formula(2) of the reaction formula) and chlorosulfonating (formula(3)) of polyethylene, and therefore it has a defect that it is difficult to control addition amount of chlorine and sulfur in the reaction product of chlorosulfonated polyethylene to a desired definite value.

The physical properties of chlorosulfonated polyethylene is remarkably influenced by amount of chlorine and sulfur, and therefore this fact is a great industrial problem in this reaction process.

Apparent from the reaction formula, as to chlorine of sulfuryl chloride, one atom of chlorine is added to polyethylene from one molecule of sulfuryl chloride, irrespective of the ratio in which the reactions of formula(2) and (3) take place (That is, it is added as $-Cl$ in formula(2) and added as $-SO_2Cl$ in formula(3) to polyethylene respectively).

On the other hand, the addition of sulfur to polyethylene is restricted to a case formula(3) takes place.

From these facts, it is understood that it is a requisite condition (1) to decide used amount of sulfuryl chloride (i.e. decide amount of chlorine to be added) and (2) to decide the ratio in which formula(3) takes place (i.e. decide amount of sulfur to be added), in order to control amounts of chlorine and sulfur added to polyethylene.

The molar amount of chlorine added to polyethylene increases with the molar amount of added sulfuryl chloride, and therefore it is easy to decide the used amount of sulfuryl chloride.

From this reason, it is a remaining technical task to control the ratio in which formula(3) takes place, in order to control the addition amount of chlorine and sulfur in chlorosulfonated polyethylene.

On the other hand, in case sulfuryl chloride and polyethylene is subjected to a reaction in use of a catalyst of radical generating agent, it is known that formula(3) is promoted by addition of amine compound.

Based on these facts, we have found a method for controlling the reaction yield of sulfur in a process for chlorinating polyethylene in a halogenated hydrocarbon in a binary phase system using sulfuryl chloride as both the chlorinating and chlorosulfonating agent. The reaction yield of sulfur is controlled by controlling the addition amount of an auxiliary catalyst amine compound (concentration of the amine compound in the halogenated hydrocarbon). In the invention the addition amounts of chlorine and sulfur of the chlorosulfonated polyethylene are controlled to produce a chlorosulfonated polyethylene having a hue that does not change with heating and that is stable during storage.

In the method of the invention, sulfuryl chloride is the sole agent added to the reaction system to chlorinate and chlorosulfonate the polyethylene. The method of the invention differs from the prior art processes which require the simultaneous use of chlorine and sulfur dioxide or of chlorine and sulfuryl chloride as chlorinating and chlorosulfonating agents.

The technical content of this invention is hereinafter described in details.

In a reaction system in which no amine compound is present, it is known that reaction yield of sulfur of a sulfuryl chloride is extremely low. However, we have found that, when trace of the amine compound is added to the reaction system, reaction yield (S) of sulfur of sulfuryl chloride increases with increment of concentration (A) of the amine compound according to the following formula (1)

$$\log_{10} S = \alpha \cdot \log_{10} A + \beta \qquad \text{formula(1)}$$

wherein
S: reaction yield (%) of sulfur of sulfuryl chloride
A: concentration (mol/liter) of amine compound in halogenated hydrocarbon solvent
$\alpha, \beta$: constant number being
$1.0 < \alpha < 3.0$
$4.0 < \beta < 12.0$ In other words, the desired chlorosulfonated polyethylene can be produced by controlling reaction ratio of sulfur of sulfuryl chloride according to formula (1).

The constant numbers $\alpha$ and $\beta$ in this formula depend on kind of amine compound, way of adding amine compound, kind and amount of radical generating agent, temperature and pressure of reaction, condition of reactor (stirring and heat-transfer etc.), kind and concentration of polyethylene, kind of solvent, reaction time and so on, and they have a few variation width, because of showing different values due to these reaction conditions.

By the way, we have also found that, when the concentration(A) of amine compound is increased to reach some region (this region is called curve-changing region for convenience), the ratio of increment in reaction yield (S) of sulfur of sulfuryl chloride to increment of concentration (A) of amine compound becomes extremely small, and formula (1) comes to be unavailable.

In other words, when the reaction is carried out in use of amine compound of amount beyond the curve-changing region, concentration (A) of amine compound and reaction yield (S) of sulfur of sulfuryl chloride, likewise as formula (1), can be represented by the following formula(4)

$$\log_{10} S = \gamma \cdot \log_{10} A + \delta \qquad \text{formula(4)}$$

wherein
S: reaction yield (%) of sulfur of sulfuryl chloride
A: concentration (mol/liter) of amine compound in halogenated hydrocarbon solvent
$\gamma, \delta$: constant number being
$0 < \gamma < 0.5$
$\delta < 3.0$ However, formula (4) is different from formula (1) in $\gamma$ being a value below 0.5.

Figure 2:
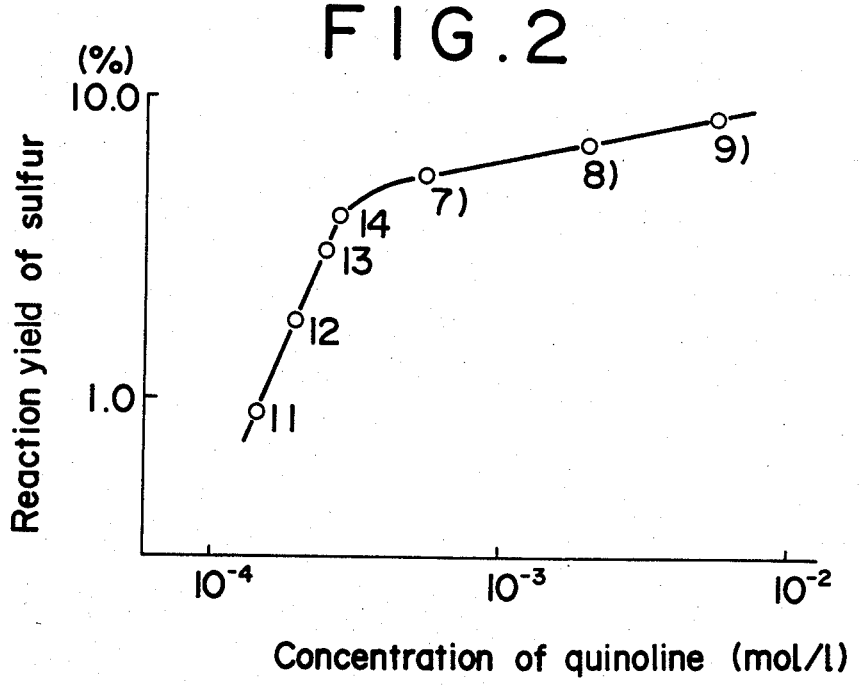

These phenomena are concretely shown in examples and comparative examples (Refer to FIG. 1 and FIG. 2).

In case of adding amine compound in amount of more than the curve-changing region, it is possible to produce chlorosulfonated polyethylene by controlling reaction ratio of sulfur of sulfuryl chloride according to formula (4). However, in this case there arises a problem that the resultant product of chlorosulfonated polyethylene suffers remarkable discoloration in an air-heated aging test.

In other words, when chips of the product are put into an air oven heated at 70° to be subjected to air-heated aging test, chlorosulfonated polyethylene, which is synthesized by controlling reaction yield of sulfur of sulfuryl chloride according to formula (4) in use of amine compound in amount of more than the curve-changing region, changes in hue thereof with lapse of time, i.e., the product which was first white changes color thereof to becomes light yellow, light brown or brown finally. The air-heated aging test is one of the heat-resisting test for rubber, but the content and the meaning of this test is detailed in "Rubber Testing (new edition)" published by Nihon Rubber Association.

It is extremely disadvantageous that a discoloration of this kind is observed in air-heated aging test, because chlorosulfonated polyethylene is a white polymer and is featured by being used in red-or blue-colored state etc. with compounding bright color.

For example, in case the product of chlorosulfonated polyethylene is preserved in a storehouse in summer, a commercial value of this product is lost completely if the product changes its color to light yellow, light brown or brown etc. due to elevation of the temperature in the storehouse.

On the other hand, concerning chlorosulfonated polyethylene produced by controlling reaction yield of sulfur of sulfuryl chloride according to formula (1), the discoloration phenomenon like this is not recognized, and chips of the product keep white color.

Therefore, in order to produce chlorosulfonated polyethylene which does not change its color even upon heating and is excellent in stability of hue at the time of storage, it is extremely important to control reaction yield of sulfur of sulfuryl chloride according to formula (1).

In other words, this invention relates to a method for producing chlorosulfonated polyethylene with controlling addition amount of sulfur of chlorosulfonated polyethylene in a process of producing chlorosulfonated polyethylene by reacting polyethylene dissolved in halogenated hydrocarbon with sulfuryl chloride in presence of a catalyst of radical generating agent, which is characterized by adding an amine compound according to the following formula (1) in a range for this formula to be available $$\log_{10} S = \alpha \cdot \log_{10} A + \beta \qquad \text{formula(1)}$$

wherein
S: reaction yield (%) of sulfur of sulfuryl chloride
A: concentration (mol/liter) of amine compound in haloganted hydrocarbon solvent
$\alpha, \beta$: constant number being
$1.0 < \alpha < 3.0$
$4.0 < \beta 12.0$ The constant numbers $\alpha$ and $\beta$ in this formula has a property of depending on each of the beforementioned factors including kind of amine compound, way of adding amine compound and so on, but values of $\alpha$ and $\beta$ do not vary when these factors are made definite by fixing reaction conditions. Then, $\alpha$ and $\beta$ can be handled as a proper value in a decided reaction condition, respectively.

On the other hand, as factors giving a great influence on decision of $\alpha$ and $\beta$ (particularly $\beta$), temperature and pressure of the reaction are mentioned. The temperature of the reaction should be decided in consideration of qualities of the produced chlorosulfonated polyethylene, but there is a tending that the reaction yield of sulfur of sulfuryl chloride become lower with elevation of the reaction temperature ($\beta$ becomes smaller).

The reaction temperature and reaction pressure are maintained so as to provide a two phase, i.e., binary phase, reaction system consisting of a liquid phase and gas phase. Within the binary phase reaction system the reaction temperature is not particularly limited if the polyethylene is homogeneously dissolved in the halogenated hydrocarbon. The preferred reaction temperature is 85° to 130° C.

The reaction pressure used in the binary phase reaction system is also not particularly limited so long as the reaction is not hindered. The quality of the reaction product is not affected by the reaction pressure but the amount of sulfur in the chlorosulfonated polyethylene increases as the reaction pressure is increased ($\beta$ becomes larger). The reaction pressure is generally at most about 8 kg/cm$^2$ and is preferaby in a range of 1.2-6.5 kg/cm$^2$ (gauge pressure).

Furthermore, prior to this reaction, it is important to perform reactions by varying addition amount of amine compound (concentration A) in a fixed reaction condition (kind of amine compound, way of adding amine compound, kind and amount of radical generating agent, temperature and pressure of reaction, reactor, kind and concentration of polyethylene, kind of solvent and reaction time), thereby to determine (1) values of $\alpha$ and $\beta$ in formula (1) and (2) concentration(A) of amine compound in the curve-changing region and, then to clarify formula (1) and the range of formula (1) being available. The concentration (A) of amine compound in the curve-changing region depends on kind of halogenated hydrocarbon solvent and kind of amine compound which is used in the reaction. For example, in case of using carbon tetrachloride as halogenated hydrocarbon solvent and using pyridine (or quinoline) as amine compound, the vicinity of $3.5 \times 10^{-4}$ mol/liter as concentration of pyridine (or quinoline) is the curve-changing region (Refer to FIG. 1 and FIG. 2).

Furthermore, it is important to perform the reaction by reproducing the above reaction conditions with high accuracy, in order to reproduce the reaction as to addition amount of chlorine and sulfur.

As kind of amine compound which acts as an auxiliary catalyst, primary amine, secondary amines, tertiary amines, aromatic amines or nitrogen containing heterocyclic compounds are mentioned, and pyridine, quinoline, isoquinoline, naphthoquinoline, aniline, monomethylaniline, dimethylaniline, nicotin, piperidine, butylamine etc. are exemplified. The concentration (mol/liter) of amine compound mentioned in this invention is calculated by total amount of finally used amine compound to amount of used halogenated hydrocarbon in every method.

As the radical generating agent used as a catalyst, azo compounds such as $\alpha,\alpha'$-azobis-isobutyronitrile, azobiscyclohexanecarbonitrile, 2,2'-azobis(2,4-dimethylvaleronitrile) and organic peroxides such as benzoyl peroxide, t-butyl peroxide, t-butyl per-benzoate, acetyl peroxide are mentioned.

The addition amount of radical generating agent acting as a catalyst is not more than 1 weight part to 100 weight parts of used polyethylene, and preferably 0.1-0.5 weight parts. The polyethylene used in this invention is defined as those including high density polyethylene (HDPE), low density polyethylene (LDPE), linear low density polyethylene (L-LDPE) and ethylene copolymers such as ethylene-vinylacetate copolymer (EVA). The amount of polyethylene is arbitrary, but it is preferable for operation of reaction to be 5-30 wt % to halogenated hydrocarbon to avoid elevation of viscosity of the reacting solution.

As halogenated hydrocarbon used as a solvent of the reaction, halogenated aliphatic hydrocarbon and halogenated aromatic hydrocarbon are mentioned, and, for example, carbon tetrachloride, chloroform, methylene chloride, trichloroethane, tetrachloroethane, monochlorobenzene, fluorobenzene, dichlorofluoromethane, dichlorodifluoromethane, trichlorofluoromethane, trichlorotrifluoroethane etc. are mentioned.

For the reactor, material thereof is selected from those durable to hydrogen chloride and sulfur dioxide, and it is recommended that heating and cooling can be performed, and stirring and heat-transfer can be fully performed.

The reaction is carried out by adding sulfuryl chloride with addition of radical generating agent such as $\alpha,\alpha'$-azobisisobutyronitrile, after dissolving polyethylene into halogenating hydrocarbon. The amount of added sulfuryl chloride is calculated on an assumption that number of mols of chlorine atoms added in polyethylene should be equal to that of the added sulfuryl chloride, and the used amount thereof is decided in accordance with the amount of chlorine in the intended chlorosulfonated polyethylene and the amount of polyethylene of the starting material.

In order to synthesize chlorosulfonated polyethylene containing 36 wt % of chlorine, 215 parts of sulfuryl chloride may be added to 100 weight parts of polyethylene.

At this time, amine compound such as pyridine and quinoline is used as an auxiliary catalyst, but the addition amount thereof is decided, corresponding to the intended amount of sulfur to be added, according to formula (1) which is previously determined.

Through these steps, the intended chlorosulfonated polyethylene, in which chlorine and sulfur are added, can be produced.

Furthermore, as the method of adding amine compound of the auxiliary catalyst, there are a method of adding it collectively prior to start of the reaction and another method of adding it successively with progress of the reaction.

The polymer solution that adding of sulfuryl chloride is completed is free of remaining acids such as hydrogen chloride, sulfur dioxide and so on remaining in the reaction mixture by blowing nitrogen gas thereinto under reflux of the solvent thereof. Next, epoxy compound such as 2,2'-bis(4-glycidyloxyphenyl) propane is added as a stabilizer.

The obtained polymer solution is fed to drum dryer or extruding dryer etc. to be separated and dried, as in the conventional method.

Following this, it is cut in chips by cutter to give the produce of chlorosulfonated polyethylene.

4. BRIEF EXPLANATION OF DRAWINGS

FIG. 1 represents reaction rate of sulfur of sulfuryl chloride to pyridine concentration and FIG. 2 represents reaction yield of sulfur of sulfuryl chloride to quinoline concentration.

In figures, numbers of 1, 2, 3 . . . 14 denote number of Examples and numbers of (1), (2), (3) . . . (9) denote number of Comparative Examples.

5. EMBODIMENTS OF EXAMPLES

Then, this invention is described in details by the Examples and Comparative Examples, but these are explained to help understanding of this invention and therefore this invention does not undergo any restriction, by these Examples.

EXAMPLE 1

Into an autoclave with glass-lining, 2.0 kg of polyethylene having melt-index 6.0 g/10 mins and density 0.956 g/cc, 11.0 l of carbon tetrachloride of solvent and $1.56 \times 10^{-3}$ mols of pyridine of auxiliary catalyst were charged and they were heated under increased pressure to dissolve polyethylene, followed by adding 4.3 kg of sulfuryl chloride and 7.0 g of $\alpha,\alpha'$-azobisisobutyronitrile dissolved in 1.0 l of carbon tetrachloride in the autoclave at a definite flow rate to perform the reaction.

During the reaction the inside temperature and the pressure of the autoclave were kept at 100° C. and 3.0 kg/cm² (gauge pressure) respectively, and it took three hours to add sulfuryl chloride etc. thereto.

Then, after the inside temperature of the autoclave was lowered to 70° C. and the pressure of the autoclave was returned to the atmospheric pressure, hydrogen chloride, sulfur dioxide and so on remaining in the polymer solution were purged out by blowing nitrogen gas into the polymer solution.

Further, 30 g of 2,2'-bis(4-glycidyloxyphenyl) propane was added as a stabilizer. Thereafter, the solution was separated into the solvent and the product over drum-dryer as in the conventional method.

As the result of analysis, it was recognized that this chlorosulfonated polyethylene contained 35.9 wt % of chlorine and 0.5 wt % of sulfur.

From this, the reaction yield of sulfur of sulfuryl chloride to the concentration of the charged pyridine was calculated and showed in FIG. 1, being summarized in Table 1.

The obtained chlorosulfonated polyethylene was cut in chips by cutter and put into an air oven (manufactured by Toyo Seiki Seisakusho Co., Ltd.) kept at 70° C.

As the result of observing changes of hue with lapse of time (aging test by heated air), it kept white color with lapse of seven days and no discoloration could be observed. These results are shown in Table 1.

EXAMPLE 2

Except changing the addition amount of pyridine as the auxiliary catalyst to $1.89 \times 10^{-3}$ mols, the reaction and the analysis of the product were carried out in the same conditions as in Example 1.

In the air-heated aging test by the air oven of 70° C., the product kept white color even with lapse of seven days and no discoloration was observed. These results are summarized in Table 1 and FIG. 1.

EXAMPLE 3

Except changing the addition amount of pyridine of the auxiliary catalyst of $2.28 \times 10^{-3}$ mols, the reaction and analysis of the product were carried out in the same conditions as in Example 1. These results are shown in Table 1 and FIG. 1

In the air-heated aging test by the air oven of 70° C., the product kept white color even with lapse of seven days and no discoloration was observed. These results are summarized in Table 1 and FIG. 1.

EXAMPLE 4

Except changing the addition amount of pyridine of the auxiliary catalyst to $2.64 \times 10^{-3}$ mols, the reaction and the analysis of the product were carried out in the same conditions as in Example 1.

In the air-heated aging test by the air oven of 70° C., the product kept white color even with lapse of seven days and no discoloration was observed. These results are summarized in Table 1 and FIG. 1.

EXAMPLE 5

Except changing the addition amount of pyridine of the auxiliary catalyst to $3.00 \times 10^{-3}$ mols, the reaction and the analysis of the product were carried out in the same conditions as in Example 1.

In the air-heated aging test by the air oven of 70° C., the product kept white color even with lapse of seven days and no discoloration was observed. These results are summarized in Table 1 and FIG. 1.

COMPARATIVE EXAMPLE 1

Except changing the addition amount of pyridine of the auxiliary catalyst to $6.60 \times 10^{-3}$ mols, the reaction and the analysis of the product were carried out in the same condition as in Example 1.

The product was put into the air oven of 70° C. and the change of hue with lapse of time under the heated condition in the same manner as in Example 1 was observed. It discolored to light yellow color with lapse of one week. These results are summarized in Table 1 and FIG. 1.

COMPARATIVE EXAMPLE 2

Except changing the addition amount of pyridine of the auxiliary catalyst to $1.80 \times 10^{-2}$ mols, the reaction and the analysis of the product were carried out in the same condition as in Example 1.

In the air-heated aging test by the oven of 70° C., the product discolored to light yellow color with lapse of three days and discolored to light brown color with lapse of seven days. These results are summarized in Table 1 and FIG. 1.

COMPARATIVE EXAMPLE 3

Except changing the addition amount of pyridine of the auxiliary catalyst to $6.60 \times 10^{-2}$ mols, the reaction and the analysis of the product were carried out in the same conditions as in Example 1.

In the air-heated aging test by the oven of 70° C., the product discolored to light brown with lapse of three days and to brown with lapse of seven days. These results are summarized in Table 1 and FIG. 1.

Except changing the addition amount of pyridine of the auxiliary catalyst, Examples 1-5 and Comparative Examples 1-3 were subjected to the reaction in the all same conditions.

As obvious from FIG. 1, the reaction yield(%) of sulfur to the pyridine concentration (mol/liter) varies greatly in its inclination, having a border on about $3.5 \times 10^{-4}$ mol/liter of the pyridine concentration (curve-changing region). The cases (Examples 1-5) that the pyridine concentration is lower than that of the curve-changing region can be approximately expressed by the following formula in the relation formula between the reaction yield (S) of sulfur of sulfuryl chloride and the pyridine concentration (A).

$$\log_{10} S = 1.84 \log_{10} A + 7.34$$

This formula demonstrates that the formula (1) is available in this region.

Also, the products obtained by these examples show no discoloration in the air-heated aging test.

On the other hand, the cases (Comparative Examples 1-3) that the pyridine concentration is higher than that of the curve-changing region can be approximately expressed by the following formula in the relation formula between the reaction yield (S) of sulfur of sulfuryl chloride and the pyridine concentration (A).

$$\log_{10}S = 0.071 \log_{10}A + 1.06$$

This formula represents the formula (4) wherein $\gamma$ is less than 0.5 ($\gamma < 0.5$), and it does not pertain to the range in which the formula (1) defined by this invention is available.

The product obtained by these Comparative Examples discolored to light yellow, light brown or brown color in the air-heated aging test.

EXAMPLE 6

Except changing the reaction temperature to 110° C., the reaction and the analysis of the product were carried out in the same conditions as in Example 1.

In the air-heated aging test by an air oven of 70° C., the product kept white color even with lapse of seven days, and no discoloration was observed. These results are summarized in Table 1 and FIG. 1.

EXAMPLE 7

Except changing the addition amount of pyridine of the auxiliary catalyst to $1.89 \times 10^{-3}$ mols and changing the reaction temperature to 110° C., the reaction and the analysis of the product were carried out in the same condition as in Example 1.

In the air-heated aging test by an air oven of 70° C., the product kept white color even with lapse of seven days, and no discoloration was observed. These results are summarized in Table 1 and FIG. 1.

EXAMPLE 8

Except changing the addition amount of pyridine of the auxiliary catalyst to $2.28 \times 10^{-3}$ mols and changing the reaction temperature to 110° C., the reaction and the analysis of the product were carried out the same conditions as in Example 1.

In the air-heated aging test by an air oven of 70° C., the product kept white color even with lapse of seven days, and no discoloration was observed. These results are summarized in Table 1 and FIG. 1.

EXAMPLE 9

Except changing the addition amount of pyridine of the auxiliary catalyst to $2.64 \times 10^{-3}$ mols and changing the reaction temperature to 110° C., the reaction and the analysis of the product were carried out in the same conditions as in Example 1.

In the air-heated aging test by an air oven of 70° C., the product kept white color even with lapse of seven days, and no discoloration was observed. These results are summarized in Table 1 and FIG. 1.

EXAMPLE 10

Except changing the addition amount of pyridine of the auxiliary catalyst to $3.00 \times 10^{-3}$ mols and changing the reaction temperature to 110° C., the reaction and the analysis of the product were carried out in the same conditions as in Example 1.

In the air-heated aging test by an air oven of 70° C., the product kept white color even with lapse of seven days, and no discoloration was observed. These results are summarized in Table 1 and FIG. 1.

COMPARATIVE EXAMPLE 4

Except changing the addition amount of pyridine of the auxiliary catalyst to $6.60 \times 10^{-3}$ and changing the reaction temperature to 110° C., the reaction and the analysis of the product were carried out in the same conditions as in Example 1.

In the air-heated aging test by an air oven of 70° C., the product discolored to light yellow color with lapse of seven days. These results are summarized in Table 1 and FIG. 1.

COMPARATIVE EXAMPLE 5

Except changing the addition amount of pyridine of the auxiliary catalyst to $1.80 \times 10^{-2}$ mols and changing the reaction temperature to 110° C., the reaction and the analysis of the product were carried out in the same conditions as in Example 1.

In the air-heated aging test by an air oven of 70° C., it discolored to light yellow with lapse of three days and discolored to light brown with lapse of seven days. These results are summarized in Table 1 and FIG. 1.

COMPARATIVE EXAMPLE 6

Except changing the addition amount of pyridine of the auxiliary catalyst to $6.60 \times 10^{-2}$ mols and changing the reaction temperature to 110° C., the reaction and the analysis of the product were carried out in the same conditions as in Example 1.

In the air-heated aging test by an air oven of 70° C., it discolored to light brown with lapse of three days and discolored to brown with lapse of seven days. These results are summarized in Table 1 and FIG. 1.

Except changing the reaction temperature to 110° C., Examples 6, 7, 8, 9, 10 and Comparative Examples 4, 5, 6 were subjected to the reaction in the same reaction conditions as in Examples 1–5 and Comparative Examples 1–3, with pyridine concentration corresponding to Examples 1, 2, 3, 4, 5 and Comparative Examples 1, 2, 3 respectively.

As obvious from FIG. 1, the reaction yield (%) of sulfur to the pyridine concentration (mol/liter) varies greatly in its inclination, having a border on about $3.5 \times 10^{-4}$ mol/liter of the pyridine concentration (curve-changing region). The cases (Examples 6–10) that the pyridine concentration is lower than that of the curve-changing region can be approximately expressed by the following formula in the relation formula between the reaction yield(S) of sulfur of sulfuryl chloride and the pyridine concentration (A)

$$\log_{10}S = 1.54 \log_{10}A + 5.92$$

This formula demonstrates that the formula (1) is available in this region.

Also, the products obtained by these Examples show no discoloration in the air-heated aging test.

On the other hand, the cases (Comparative Examples 4–6) that the pyridine concentration is higher than that of the curve-changing region can be approximately expressed by the following formula in the relation formula between the reaction yield(S) of sulfur of sulfuryl chloride and the pyridine concentration (A)

$$\log_{10}S = 0.065 \log_{10}A + 0.78$$

This formula does not pertain to the range in which the formula (1) of this invention is available.

The products obtained by these Comparative Examples discolored to light yellow, light brown or brown in the air-heated aging test.

Then, comparing two curves in FIG. 1 each other (i.e., one is the curve of binding Examples 1–5 to Comparative Examples 1–3 and another is the curve of binding Examples 6–10 to Comparative Examples 4–6), it is understood that the reaction yield of sulfur of sulfuryl chloride is lowered when the reaction temperature is raised, provided other conditions are definite. That is, it is possible to perform the desired investigations by varying the reaction temperature, the reaction pressure and other reaction conditions respectively.

EXAMPLE 11

In the autoclave used in Example 1, 2.0 kg of polyethylene having melt-index 8.0 g/10 mins and density 0.919 g/cc. and 11.0 liter of carbon tetrachloride of the solvent were charged and they were heated to dissolve polyethylene therein.

After dissolving 7.0 g of $\alpha,\alpha'$-azobisisobutyronitrile and $1.80 \times 10^{-3}$ mols of quinoline of the auxiliary catalyst into 1.0 liter of carbon tetrachloride, this solution and 4.3 kg of sulfuryl chloride were added at a definite flowing rate therein to commence the reaction.

During the reaction the inside temperature of the autoclave and the pressure thereof were kept at 95° C. and 2.5 kg/cm$^2$ (gauge pressure) respectively, and it took two hours and half to add sulfuryl chloride etc. therein.

After completion of the reaction, the inside temperature of the autoclave was lowered to 70° C. and the pressure of the autoclave was returned to the atmospheric pressure, and thereafter hydrogen chloride, sulfur dioxide and so on remaining in the polymer solution were purged out by blowing nitrogen gas into the polymer solution. Further, 30 g of 2,2'-bis(4-glycidyloxyphenyl) propane was added as a stabilizer.

Thereafter, the solution was separated into the solvent and the product over drum-dryer as in the conventional method.

As the result of analysis, it was recognized that this chlorosulfonated polyethylene contained 35.9 wt % of chlorine and 0.3 wt % of sulfur.

From this, the reaction ratio of sulfur of sulfuryl chloride was calculated and showed in FIG. 2, being summarized in Table 1.

The obtained chlorosulfonated polyethylene was cut in chips by cutter and put into an air oven kept at 70° C.

Changes in hue of the product with lapse of time (aging test by heated air) were observed under the heated condition as in Example 1. It kept white color even with lapse of seven days and no discoloration could be observed. These results are shown in Table 1.

EXAMPLE 12

Except changing the amount of quinoline of the auxiliary catalyst to $2.41 \times 10^{-3}$ mols, the reaction and the analysis of the product were carried out in the same conditions as in Example 11.

In the air-heated aging test by an air oven of 70° C., the product kept white color even with lapse of seven days, and no discoloration was observed. These results are summarized and shown in Table 1 and FIG. 2.

EXAMPLE 13

Except changing the amount of quinoline of the auxiliary catalyst to $3.02 \times 10^{-3}$ mols, the reaction and the analysis of the product were carried out in the same conditions as in Example 11.

In the air-heated aging test by an air oven of 70° C., the product kept white color even with lapse of seven days, and no discoloration was observed. These results are summarized and shown in Table 1 and FIG. 2.

EXAMPLE 14

Except changing the amount of quinoline of the auxiliary catalyst to $3.36 \times 10^{-3}$ mols, the reaction and the analysis of the product were carried out in the same conditions as in Example 11.

In the air-heated aging test by an air oven of 70° C., the product kept white color even with lapse of seven days and no discoloration was observed. These results are summarized and shown in Table 1 and FIG. 2.

COMPARATIVE EXAMPLE 7

Except changing the amount of quinoline of the auxiliary catalyst to $6.60 \times 10^{-3}$ mols, the reaction and the analysis of the product were carried out in the same conditions as in Example 11.

In the air-heated aging test by an air oven of 70° C., it discolored to lighter brown color with lapse of seven days. These results are summarized and shown in Table 1 and FIG. 2.

COMPARATIVE EXAMPLE 8

Except changing the amount of quinoline of the auxiliary catalyst to $2.42 \times 10^{-2}$ mols, the reaction and the analysis of the product were carried out in the same conditions as in Example 11.

In the air-heated aging test by an air oven of 70° C., it discolored to lighter brown with lapse of three days and to light brown with lapse of seven days. These results are summarized and shown in Table 1 and FIG. 2.

COMPARATIVE EXAMPLE 9

Except changing the amount of quinoline of the auxiliary catalyst to $6.59 \times 10^{-2}$ mols, the reaction and the analysis of the product were carried out in the same conditions as in Example 11.

In the air-heated aging test by an air oven of 70° C., it discolored to brown with lapse of three days. These results are summarized and shown in Table 1 and FIG. 2.

In Example 11–14 and Comparative Examples 7–9, the reaction were commenced by adding quinoline of the auxiliary catalyst successively into the reactor at the reaction temperature of 95° C. and at the reaction pressure of 2.5 kg/cm$^2$ (gauge pressure).

As obvious from FIG. 2, the reaction yield(S) of sulfur of sulfuryl chloride to the quinoline concentration(A) varies greatly in the vicinity of the quinoline concentration being about $3.5 \times 10^{-4}$ mols/liters (the curved-changing region). The cases (Examples 11–14) that the quinoline concentration is lower than that of the curved-changing region can be approximately expressed by the following formula in the relation formula between the reaction yield(S) of sulfur of sulfuryl chloride and the quinoline concentration.

$$\log_{10} S = 2.39 \log_{10} A + 9.10$$

This formula demonstrates that the formula (1) is available in this region.

Also, these products did not discolor in the air-heated aging test.

On the other hand, the cases (Comparative Examples 7–9) that the quinoline concentration is higher than that of the curve-changing region can be approximately expressed by the following formula in the relation formula between the reaction yield (S) of sulfur of sulfuryl chloride and the quinoline concentration (A)

$$\log_{10} S = 0.19 \log_{10} A + 1.37$$

trolling the reaction ratio of sulfur of sulfuryl chloride according to this invention do not discolor in hue of the products at the time of heating, and therefore it is understood that they are chlorosulfonated polyethylenes which are excellent in stability of hue at the time of storage.

From these facts, it is clear that this invention has excellent features as the method of controlling the addition amount of chlorine and sulfur of chlorosulfonated polyethylene.

TABLE 1

Conditions of synthesizing chlorosulfonated polyethylene and results of analyzing products

| | | | Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| condition of reaction | temperature (°C.) | a | 100 | 100 | 100 | 100 | 100 | 110 | 110 | 110 | 110 | 110 | 95 |
| | pressure (kg/cm$^2$) | b | 3.0 | 3.0 | 3.0 | 3.0 | 3.0 | 3.0 | 3.0 | 3.0 | 3.0 | 3.0 | 2.5 |
| amine compound | kind* | c | P | P | P | P | P | P | P | P | P | P | Q |
| | addition amount (mol) | d | $1.56 \times 10^{-3}$ | $1.89 \times 10^{-3}$ | $2.28 \times 10^{-3}$ | $2.64 \times 10^{-3}$ | $3.00 \times 10^{-3}$ | $1.56 \times 10^{-3}$ | $1.89 \times 10^{-3}$ | $2.28 \times 10^{-3}$ | $2.64 \times 10^{-3}$ | $3.00 \times 10^{-3}$ | $1.80 \times 10^{-3}$ |
| | concentration** (mol/l) | e | $1.30 \times 10^{-4}$ | $1.58 \times 10^{-4}$ | $1.90 \times 10^{-4}$ | $2.20 \times 10^{-4}$ | $2.50 \times 10^{-4}$ | $1.30 \times 10^{-4}$ | $1.58 \times 10^{-4}$ | $1.90 \times 10^{-4}$ | $2.20 \times 10^{-4}$ | $2.50 \times 10^{-4}$ | $1.50 \times 10^{-4}$ |
| elementary analysis of products | chlorine (wt %) | f | 35.9 | 35.8 | 35.8 | 35.9 | 35.8 | 35.9 | 35.9 | 35.9 | 35.8 | 35.8 | 35.9 |
| | sulfur (wt %) | g | 0.5 | 0.7 | 1.0 | 1.3 | 1.6 | 0.3 | 0.4 | 0.5 | 0.7 | 0.8 | 0.3 |
| reaction yield (%) of sulfur of sulfuryl chloride*** | | h | 1.5 | 2.1 | 3.1 | 4.0 | 4.9 | 0.9 | 1.2 | 1.5 | 2.1 | 2.4 | 0.9 |
| change of hue by air heating aging test of products | before test | i | white | white | white | white | white | white | white | white | white | white | white |
| | 3 days after | j | white | white | white | white | white | white | white | white | white | white | white |
| | 7 days after | k | white | white | white | white | white | white | white | white | white | white | white |

| | | | Examples | | | Comparative Examples | | | | | | | | |
|---|---|---|---|---|---|---|---|---|---|---|---|---|---|---|
| | | | 12 | 13 | 14 | 1 | 2 | 3 | 4 | 5 | 6 | 7 | 8 | 9 |
| condition of reaction | temperature (°C.) | a | 95 | 95 | 95 | 100 | 100 | 100 | 110 | 110 | 110 | 95 | 95 | 95 |
| | pressure (kg/cm$^2$) | b | 2.5 | 2.5 | 2.5 | 3.0 | 3.0 | 3.0 | 3.0 | 3.0 | 3.0 | 2.5 | 2.5 | 2.5 |
| amine compound | kind* | c | Q | Q | Q | P | P | P | P | P | P | Q | Q | Q |
| | addition amount (mol) | d | $2.41 \times 10^{-3}$ | $3.02 \times 10^{-3}$ | $3.36 \times 10^{-3}$ | $6.60 \times 10^{-3}$ | $1.80 \times 10^{-2}$ | $6.60 \times 10^{-2}$ | $6.60 \times 10^{-3}$ | $1.80 \times 10^{-2}$ | $6.60 \times 10^{-2}$ | $6.60 \times 10^{-3}$ | $2.42 \times 10^{-2}$ | $6.59 \times 10^{-2}$ |
| | concentration** (mol/l) | e | $2.01 \times 10^{-4}$ | $2.52 \times 10^{-4}$ | $2.80 \times 10^{-4}$ | $5.50 \times 10^{-4}$ | $1.50 \times 10^{-3}$ | $5.50 \times 10^{-3}$ | $5.50 \times 10^{-4}$ | $1.50 \times 10^{-3}$ | $5.50 \times 10^{-3}$ | $5.50 \times 10^{-4}$ | $2.02 \times 10^{-3}$ | $5.49 \times 10^{-3}$ |
| elementary analysis of products | chlorine (wt %) | f | 35.9 | 35.8 | 35.9 | 35.8 | 35.8 | 35.8 | 35.9 | 35.8 | 35.8 | 35.8 | 35.9 | 35.8 |
| | sulfur (wt %) | g | 0.6 | 1.0 | 1.3 | 2.2 | 2.4 | 2.6 | 1.2 | 1.3 | 1.4 | 1.8 | 2.3 | 2.8 |
| reaction yield (%) of sulfur of sulfuryl chloride*** | | h | 1.8 | 3.1 | 4.0 | 6.7 | 7.3 | 7.9 | 3.7 | 4.0 | 4.3 | 5.5 | 7.0 | 8.6 |
| change of hue by air heating aging test of products | before test | i | white | white | white | white | white | white | white | white | white | white | white | white |
| | 3 days after | j | white | white | white | white | light yellow | light brown | white | light yellow | light brown | white | lighter brown | brown |
| | 7 days after | k | white | white | white | light yellow | light brown | brown | light yellow | light brown | brown | lighter brown | light brown | brown |

*P: pyridine
Q: quinoline
**concentration to carbon tetrachloride
***calculated value determined by the result of elementary analysis This formula does not pertain to the range wherein the formula (1) of this invention is available. The products obtained by these Comparative Examples discolored to lighter brown, light brown or brown in the air-heated aging test.

Referred to these Examples and Comparative Examples, chlorosulfonated polyethylene produced by con-

We claim:

1. A method for producing chlorosulfonated polyethylene with controlled addition of the amount of sulfur of the chlorosulfonated polyethylene comprising the step of chlorinating and chlorosulfonating polyethylene dissolved in halogenated hydrocarbon with a chlorinating and chlorosulfonating agent consisting of sulfuryl chloride at a reaction pressure of 1.2 to 6.5 kg/cm² gauge pressure in the presence of a catalyst of a radical generating agent and in a binary phase system, wherein the addition amount of sulfur is controlled by adding an amine compound in a range defined by the following formula (1)

$$\log_{10} S = \alpha \cdot \log_{10} A + \beta \qquad \text{formula (1)}$$

wherein S denotes reaction yield (%) of sulfur of sulfuryl chloride, A denotes concentration (mol/liter) of the amine compound in halogenated hydrocarbon solvent, and $\alpha, \beta$ denote constant numbers, respectively being $1.0 < \alpha < 3.0$ and $4.0 < \beta < 12.0$, and wherein the amine compound is selected from the group consisting of pyridine and quinoline, the amount of the amine compound being from at least a trace amount up to about $3.5 \times 10^{-4}$ mol/liter.

2. The method for producing chlorosulfonated polyethylene recited in claim 1, wherein separated amount of the amine compound is successively added with progress of the reaction.

3. The method for producing chlorosulfonated polyethylene recited in claim 1, wherein the reaction temperature is 85° to 130° C.

4. The method of producing chlorosulfonated polyethylene recited in claim 1, wherein total amount of the amine compound is collectively added prior to start of the reaction.

5. The method for producing chlorosulfonated polyethylene recited in claim 1, wherein the polyethylene is used in an amount of 5 to 30 wt % to the halogenated hydrocarbon solvent.

6. The method for producing chlorosulfonated polyethylene recited in claim 1, wherein the polyethylene is at least one selected from the group consisting of high density polyethylene, low density polyethylene, linear low density polyethylene and ethylene copolymer such as ethylene-vinylacetate copolymer.

7. The method for producing chlorosulfonated polyethylene recited in claim 1, wherein the halogenated hydrocarbon used as the solvent is a halogenated aliphatic hydrocarbon and/or a halogenated aromatic hydrocarbon.

8. The method for producing chlorosulfonated polyethylene recited in claim 1, wherein an epoxy compound of a stabilizer is added into the resultant polymer solution.

9. The method for producing chlorosulfonated polyethylene recited in claim 1, wherein the radical generating agent is at least one selected from the group consisting of azo compounds and organic peroxides.

10. The method for producing chlorosulfonated polyethylene recited in claim 1, wherein the radical generating agent is used in an amount of not more than one weight part per 100 weight parts of the used polyethylene.

* * * * *